United States Patent
Frederiksen

[15] 3,697,736
[45] Oct. 10, 1972

[54] AIRFIELD INSET RUNWAY LIGHT

[72] Inventor: Erik Frederiksen, Birkerod, Denmark

[73] Assignee: Laur. Knudsen, Nordisk Elektricitets Selskab, Copenhagen, Denmark

[22] Filed: Nov. 24, 1970

[21] Appl. No.: 92,353

[30] Foreign Application Priority Data

Nov. 26, 1969 Denmark...................6269/69

[52] U.S. Cl.................240/1.2, 240/106.1, 340/25, 350/286
[51] Int. Cl..............................B64f 1/20
[58] Field of Search..........240/1.2, 106.12 M, 151, 46.49 A; 340/25, 26; 350/286, 287, 204; 356/106–113

[56] References Cited

UNITED STATES PATENTS

| 2,745,310 | 5/1956 | Horn | 350/204 |
| 3,155,321 | 11/1964 | McDonald | 246/1.2 |
| 3,320,019 | 5/1967 | Brunelle, Jr. et al. | 350/286 |
| 3,327,104 | 6/1967 | Loch | 240/1.2 |

FOREIGN PATENTS OR APPLICATIONS 1,183,455  12/1964  Germany.............240/1.2 UX

*Primary Examiner*—Louis J. Capozi
*Attorney*—Watson, Cole, Grindle & Watson

[57] ABSTRACT

In an airfield inset runway light a prism of substantially rhombic cross section is mounted in a housing with the major axis of the rhomb in substantially horizontal position and the prism is illuminated from two sides below the major axis in order to radiate rays from the upper surfaces of the prism so that the radiated rays form a small angle with the horizontal direction.

5 Claims, 2 Drawing Figures

PATENTED OCT 10 1972 3,697,736

INVENTOR

Erik Fredriksen

BY Watson, Cole, Grindle & Watson
ATTORNEY

AIRFIELD INSET RUNWAY LIGHT

BACKGROUND OF THE INVENTION

This invention relates to an airfield inset runway light of the type comprising a housing with a prism and lamps for illuminating said prism from two sides.

A light of this type is known from the German Pat. specification No. 1,183,455. In this known light the prism is constructed with a horizontal upper face and the light rays radiate from the said upper face in two main directions at small angles to the horizontal plane. A pilot observing the light and having his eye positioned in a main light ray will see a luminous area which is small as compared with the size of the housing of the light, viz. equal to the area of the horizontal upper face of the prism multiplied by the sine of the angle between the direction of the main light ray and the horizontal plane. In other words, the so-called light aperture of the light is very small and it is therefore necessary to use powerful special lamps in order to obtain a sufficiently high light intensity or the prism must be made very large. Moreover, the pilot will at the same time see a substantial part of the upper face of the housing of the light.

SUMMARY OF THE INVENTION

According to the invention, the prism has substantially a rhombic cross section and is mounted with the major axis of the rhomb in substantially horizontal position. By using such a prism there is obtained a radiation in two main directions at small angles to the horizontal plane and with a sufficient light intensity, when using ordinary halogen glow lamps, and with a relatively small and low housing and a small prism extending only a short distance above the plane of the runway (less than 10 mm). It has been found that with this arrangement of the prism the light aperture, as referred to above, can be made a maximum, even at small angles of the main light rays, such as 2° — 4°.

DESCRIPTION OF THE PREFERRED EMBODIMENT

Figure 2:
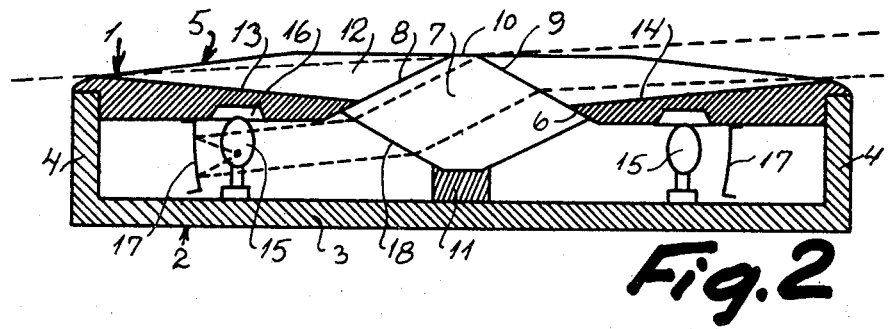
Figure 1:
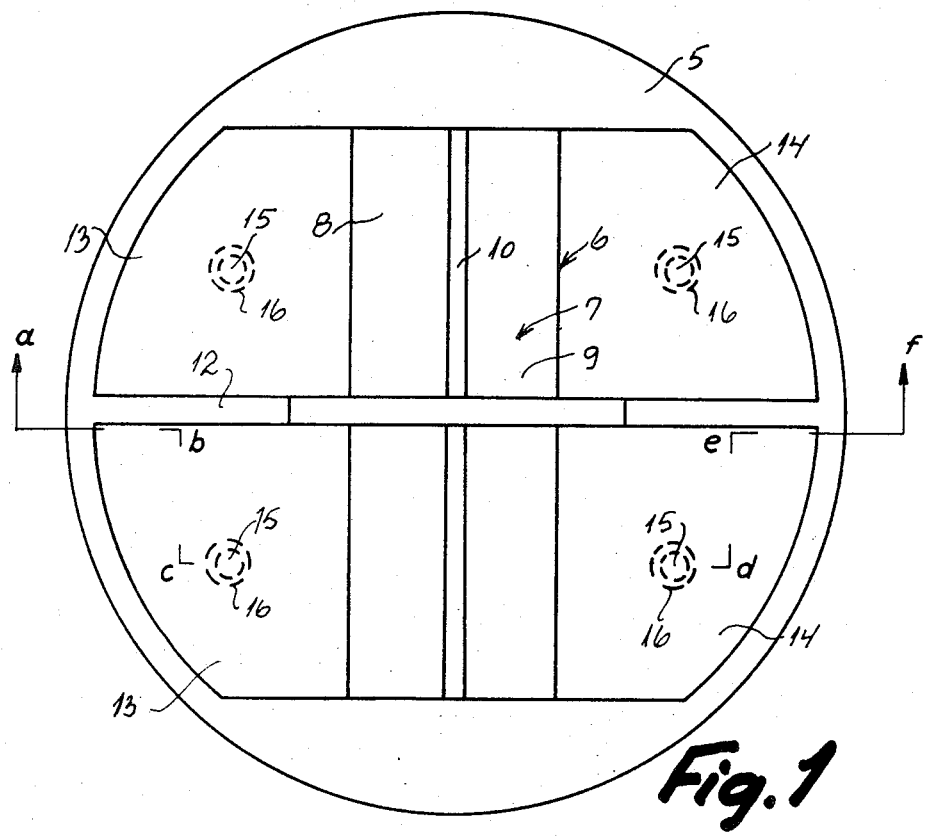
FIG 1 shows a plane view of a light according to one embodiment of the invention, and FIG 2 a vertical section along the line a, b, c, d, e, f in FIG 1.

The light shown in the drawing comprises a housing 1, which has a lower part 2 for embedding in the pavement of a runway. The lower part 2 has a plane bottom 3 and a cylindrical side wall 4. A cover 5 forms the upper enclosure of the housing and is removably connected with the lower part 2 in a manner not shown.

The cover 5 has an rectangular opening 6, which forms a seat for a prism 7 of substantially rhombic cross section, which prism is mounted with its longer diagonal or major axis in horizontal position, two adjacent surfaces 8 and 9 of the prism extending upwards through the opening 6. The top edge of the prism is chamfered at 10.

At its underside the prism 7 is supported by a foot 11 mounted on the bottom 3. To protect the prism against wheel pressure a transverse rib 12 is provided which forms the highest point of the light. On each side of the transverse rib 12 the cover has plane surfaces 13 and 14, which slope slightly from the circumference of the cover towards the prism.

In the housing there are mounted four light sources 15 in the form of ordinary halogen glow lamps, e.g., 12 V - 55W. As shown a recess 16 is provided in the bottom face of the cover above each lamp. On the side of each lamp remote from the prism there is provided a reflector 17 preferably of parabolic shape, which reflects the light onto and through one of the lower prism surfaces 18. The light is refracted as shown and passes out of the opposite prism surface 9 in a direction which is substantially parallel to the direction of the light before it entered the prism.

The path of the light rays is only shown for one of the lamps 15, but it is the same for the other three lamps, though inverted for two of the lamps so that light rays are emitted from the light in two substantially opposite main directions forming small angles with the horizontal plane, in the case considered about 3.5°. It will be seen that a person who has his eye in the light ray shown in dotted line and observes the light will be able to see the edge of the cover 5 in front of the prism (the lower dotted line) and the edge of the cover behind the prism (the extension of the upper dotted line beyond the top of the prism). Between these contour limits the person will only see the prism surface 9 and exactly the portion of this, which is fully illuminated from the lamp 15. Thus, the light has maximum light aperture in these main directions and maximum light intensity in the same directions, which result is obtained even if the prism extends less than 10 mm above the pavement of the runway. In laboratory tests made with a rhombic prism according to the invention, the emitted light had, as referred to a vertical plane, an increasing light intensity from 0° to 3°, where the light intensity was about 6,2000 international candles, whereafter the light intensity drops abruptly to about 1,000 international candles at an angle of 6°. In the horizontal plane, the light intensity amounted to 6,2000 international candles within an angle of about 3°.

When it is stated that the prism is substantially rhombic and has its major axis in a substantially horizontal position, it is intended to imply that the top and bottom edges of the prism can be chamfered as indicated and that it may be desirable that the major axis is slightly inclined or there is some deviation from the rhombic shape, if it is desired to have slightly different angles between the two main directions and the horizontal plane.

I claim:

1. An inset runway light for an airfield comprising:
   a housing, a prism having a rhombic cross section mounted within said housing with the major axis of the rhomb in a substantially horizontal plane, and means for illuminating the bottom surfaces of said prism whereby light is directed from the upper surfaces of said prism in two substantially opposite directions.

2. An inset runway light as in claim 1 further comprising a cover mounted over said housing, said cover including an aperture for mounting said prism, a rib member extending transversely across said housing for protecting said prism from wheel pressure, and plane surfaces on each side of said rib member, said surfaces sloping from the circumference of said cover towards said prism.

3. An inset runway light as in claim 1 wherein the top edge of said prism is chamfered, and said means for illuminating include a light source mounted within each quadrant formed by said chamfered edge and said rib member, and said housing further includes a reflector for each light source mounted to reflect light onto and through a respective one of the lower prism surfaces.

4. An inset runway light as in claim 3 wherein the light rays emitted from the upper prism surfaces have an angle of approximately 3.5° with respect to the horizontal plane.

5. An inset runway light as in claim 2 wherein the upper surfaces of said prism extend above said opening to the under surface of said cover.

* * * * *